United States Patent [19]

Harrington et al.

[11] Patent Number: 5,500,891
[45] Date of Patent: Mar. 19, 1996

[54] TELECOMMUNICATION SYSTEM WITH MULTILINK HOST COMPUTER CALL CONTROL INTERFACE SYSTEM AND METHOD

[76] Inventors: Noreen A. Harrington, 1818 Appaloosa Dr., Naperville, Ill. 60565; Mark J. Michelson, 2 N 078 Mulhurn Dr., Elburn, Ill. 60119

[21] Appl. No.: 316,695

[22] Filed: Sep. 30, 1994

[51] Int. Cl.[6] .................................................. H04M 1/64
[52] U.S. Cl. ........................ 379/265; 379/269; 379/309
[58] Field of Search ................................. 379/266, 265, 379/201, 214, 210–212, 309, 269

[56] References Cited

U.S. PATENT DOCUMENTS

| 5,001,710 | 3/1991 | Gawrys et al. | 379/265 |
| 5,153,909 | 10/1992 | Beckle et al. | 379/265 |
| 5,181,239 | 1/1993 | Jolissaint | 379/266 |

*Primary Examiner*—Ahmad F. Matar

[57] ABSTRACT

A telecommunication system (10) having a single automatic call distributor (12) with a multiport switch (14) controlled by a central control processing unit (16) and an associated memory (18) for selectively interconnecting telephonic calls between external telephonic units (20) of an external telephonic network (24) and internal telephonic units (26A, 26B, 26C, 26D) coupled with the multiport switch (14) with a multilink host computer call control interface system (25) having a plurality of host computers (32A, 32B, 32C, 32D) coupled to the automatic call distributor and logical link interfaces (36A, 36B, 36C, 36D) each having a pair of physical link lines (38A, 38B, 38C, 38D) which correspond to an associated host computer (32A, 32B, 32C, 32D) to enable communication between the single automatic call distributor (12) and the plurality of host computers (32A, 32B, 32C, 32D) to provide the host computers with control of call handling operations performed at the automatic call distributor (12).

18 Claims, 7 Drawing Sheets

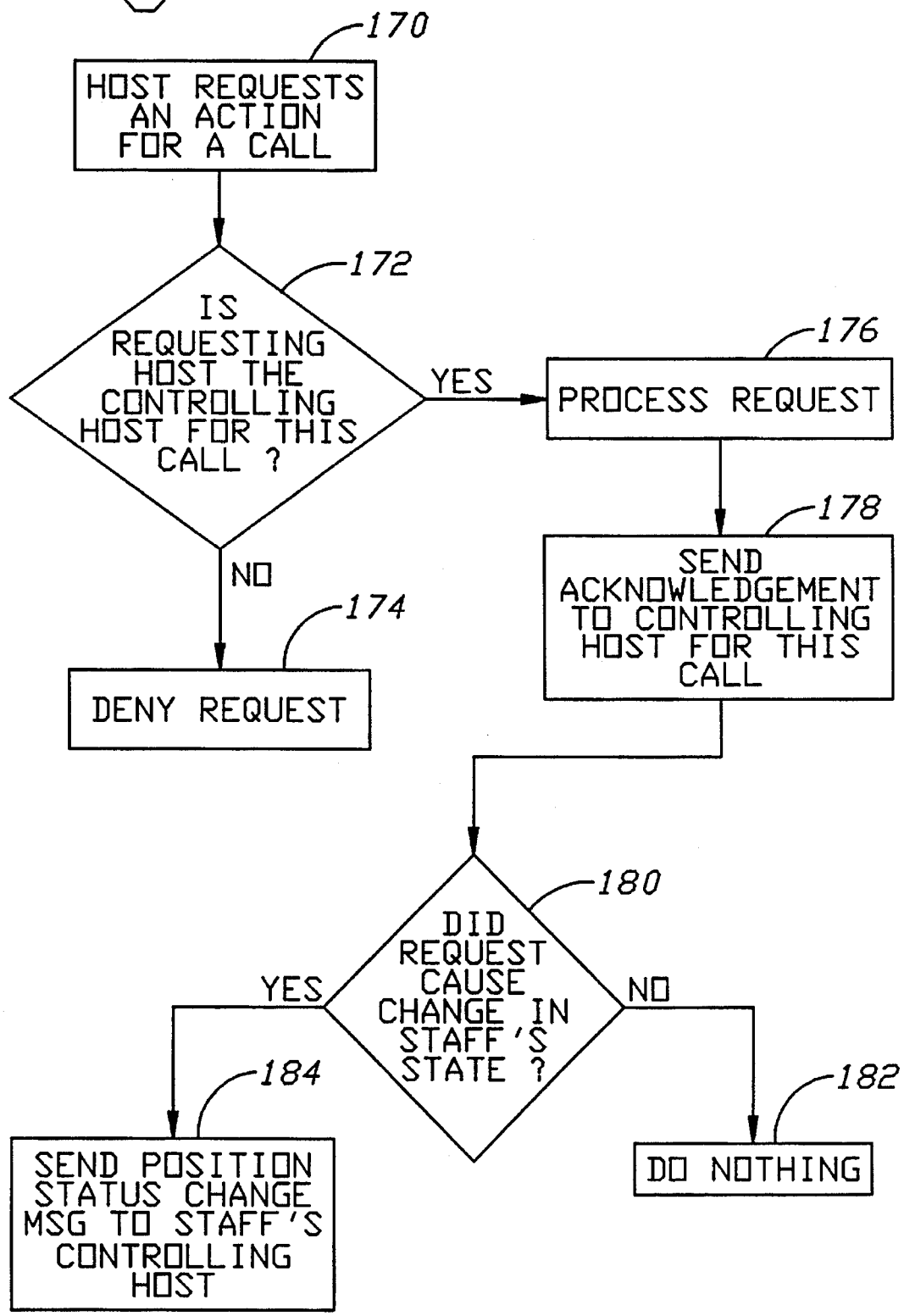

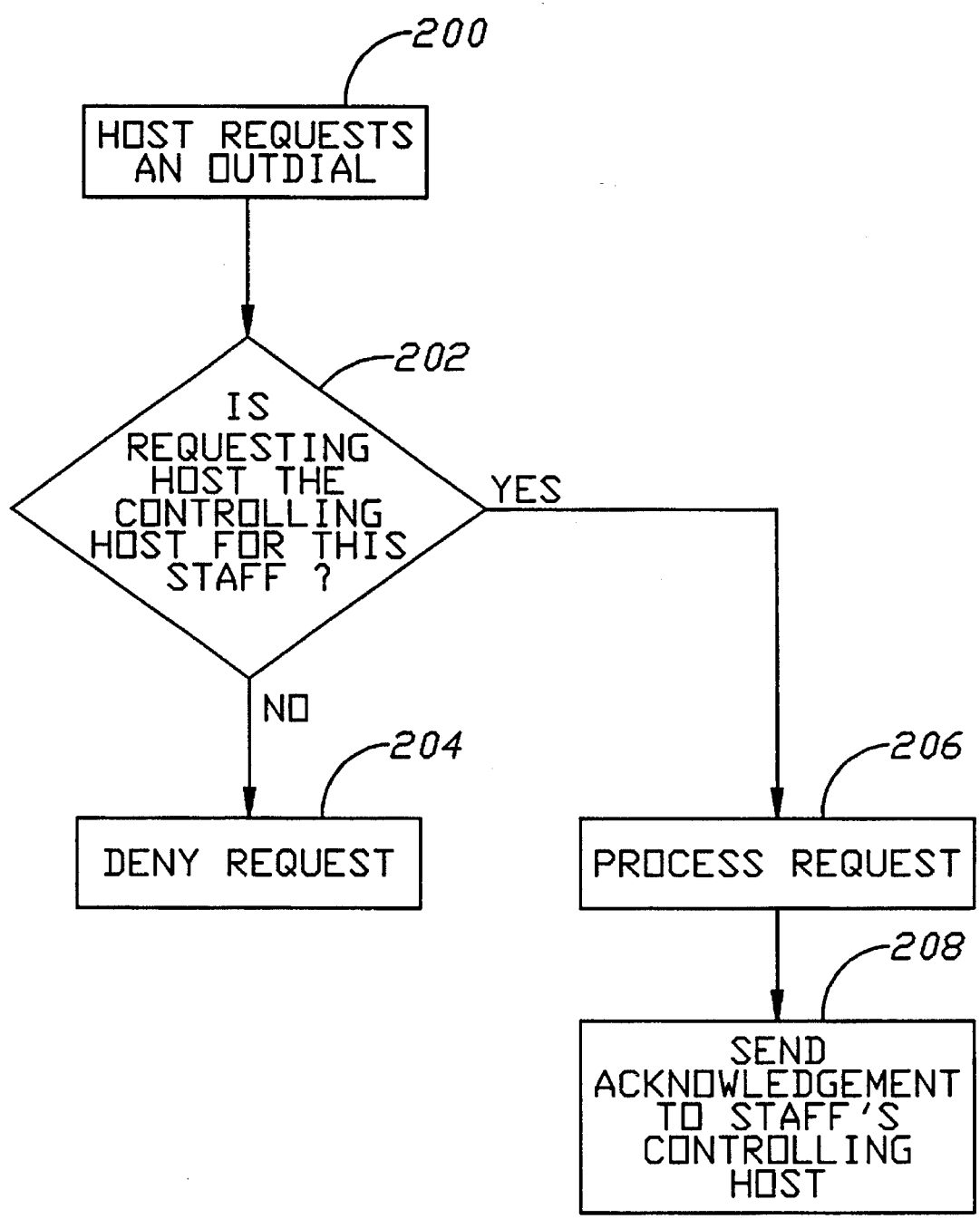

TELECOMMUNICATION SYSTEM WITH MULTILINK HOST COMPUTER CALL CONTROL INTERFACE SYSTEM AND METHOD

BACKGROUND OF THE INVENTION

1. Field of the Invention

This invention relates generally to the field of telecommunication systems having an automatic call distributor and, more particularly, to such systems having a host data base computer for controlling specialized features at the automatic call distributor.

2. Description of the Related Art Including Information Disclosed Under 37 C.F.R. Section 1.97–1.99

Telecommunication systems having an automatic call distributor with a multiport switch controlled by a central processing unit in conjunction with a main memory for selectively interconnecting telephonic calls received from external telephones of an external telephonic network with internal telephonic units coupled with the multiport switch are well known. Examples of such telecommunication systems are shown in U.S. Pat. No. 5,268,903 of Jones et al. entitled "Multichannel Telephonic Switching Network With Different Signaling Formats and Connect/PBX Treatment Selectable For Each Channel" issued Dec. 7, 1993; U.S. Pat. No. 5,140,611 of Jones et al. entitled "Pulse Modulated Self-Clocking and Self-Synchronizing Data Transmission and Method for a Telephonic Communication Switching System" issued Aug. 18, 1992; U.S. Pat. No. 5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunications Switching System" issued Dec. 2, 1986.

It is also known in such systems to have a host data base computer coupled with the automatic call distributor. The host computer primarily provides data base access to customer information such as names, addresses, purchasing order and other data pertaining to customers calling through the external telephonic network. Furthermore, it is known in certain telecommunication systems to activate selected call servicing functions at the host data base computer. In such systems the various features are controlled by conversations between the automatic call distributor (ACD) and the individual host computer. Based on the messaging between a single host computer and an ACD, the host computer is enabled to initiate a feature such as call routing, call transfer or synchronize matching customer data to appear at a display screen upon the connection of an incoming customer call. Controlling various call servicing features at the single host computer enables the system user to provide a specialized service application, otherwise not available if the entire call control is performed at the ACD.

In such systems having host initiated features, the ACD sends a message identifying an incoming call to the host computer. The host is able to match the information received about the call with its own data base of information regarding the caller and appropriately direct the ACD to handle the call in a preferred manner. Since, the individual host computer has information about the call, the host selectively transmits specialized information stored in the data base regarding the caller to the terminal screen of the agent servicing the call.

Disadvantageously, host computer initiated call handling features are limited to such systems which have only a single host data base computer. However, it is often desirable for the user of a system to have an ACD which communicates with more than just a single host computer. Unfortunately, such systems are not capable of having multiple host computers which initiate call servicing features at a single associated automatic call distributor. In such systems, a corresponding automatic call distributor must be allocated and connected with each of the associated host data base computers. This proves to be extraordinarily expensive to the user since each host computer must have a corresponding ACD. Furthermore, this is an inefficient use of system resources since call distributors have the capability to execute a variety of call servicing functions.

It is desirous among purchasers of telephonic switching equipment providing many call servicing applications (such as customer sales, customer service, collection, out-dial telemarketing calling etc.) to have many different host computers in an automatic call distribution environment. Each of the host computers has data base information which is specific to a particular application or telemarketing campaign. By assigning each host computer to a particular application, and thus storing only certain types of information, a host computer operator or programmer is not required to be technically sophisticated and trained for all possible applications which are available at the call distributor. Thus, a host program operator at one host computer needs only to be concerned with collection data, another program operator at another host needs only to be concerned with customer service, and so forth. Therefore, by having multiple hosts computers each containing information relevant to a specific customer need, allows the individual program operators at the associated host computers to be familiar only with the specific application, campaign or particular customer information at their assigned host computer.

Additionally, a single automatic call distributor may service incoming calls for more than one company. Each company would have their own associated host data base computer storing proprietary customer information specific to each company. Accordingly, a single host data base computer cannot be employed for storing confidential customer information of different corporations thereby requiring the need for multiple host computers to communicate with the ACD. Disadvantageously, however, in known telecommunication systems, for different host computers having data which service and initially control different call distribution applications, a separate ACD switch is required for each individual host computer. Moreover, only a single host data base computer could activate call servicing features at an ACD. Therefore, the limitations of the known systems significantly restrict the call servicing capabilities of automatic call distribution systems requiring multiple host computers.

SUMMARY OF THE INVENTION

It is therefore a principal object of the present invention to provide a telecommunication system having and automatic call distributor and a multilink host computer call control interface system and method in which the disadvantages of known telecommunication systems noted above are overcome by providing means and methods for establishing calling control communication between a plurality of host computers and a single automatic call distributor.

The object is achieved by providing a telecommunication system having a single automatic call distributor with a multiport switch controlled by a central control processing unit and an associated memory for selectively interconnecting telephonic calls between external telephonic units of an external telephonic network and internal telephonic units coupled with the multiport switch with a multilink host computer call control interface system having a plurality of host computers coupled to the automatic call distributor and means for enabling communication between the single automatic call distributor and the plurality of host computers to provide the plurality of host computers with control of call handling operations performed at the automatic call distributor.

The object is further achieved by performing a method of initiating multiple host computer call control in a telecommunication system having a single automatic call distributor with a multiport switch controlled by a central control processing unit and an associated memory for selectively interconnecting telephonic calls between external telephonic units of an external telephonic network and internal telephonic units coupled with the multiport switch comprising the steps of (1) coupling a plurality of host computers to the single automatic call distributor and (2) enabling communication between the single automatic call distributor and the plurality of host computers to provide the plurality of host computers with control of call handling operations performed at the automatic call distributor.

BRIEF DESCRIPTION OF THE DRAWING

The foregoing objects and advantageous features of the invention will be explained in greater detail and others will be made apparent from the detailed description of the preferred embodiment of the present invention which is given with reference to the several figures of the drawing, in which:

FIG. 3 is a flow chart of the preferred method of processing a telephonic calling action request from a host computer;

FIG. 4 is a flow chart of the preferred method of processing an out-dial calling request initiated from a host computer.

DESCRIPTION OF THE PREFERRED EMBODIMENT

Figure 1:
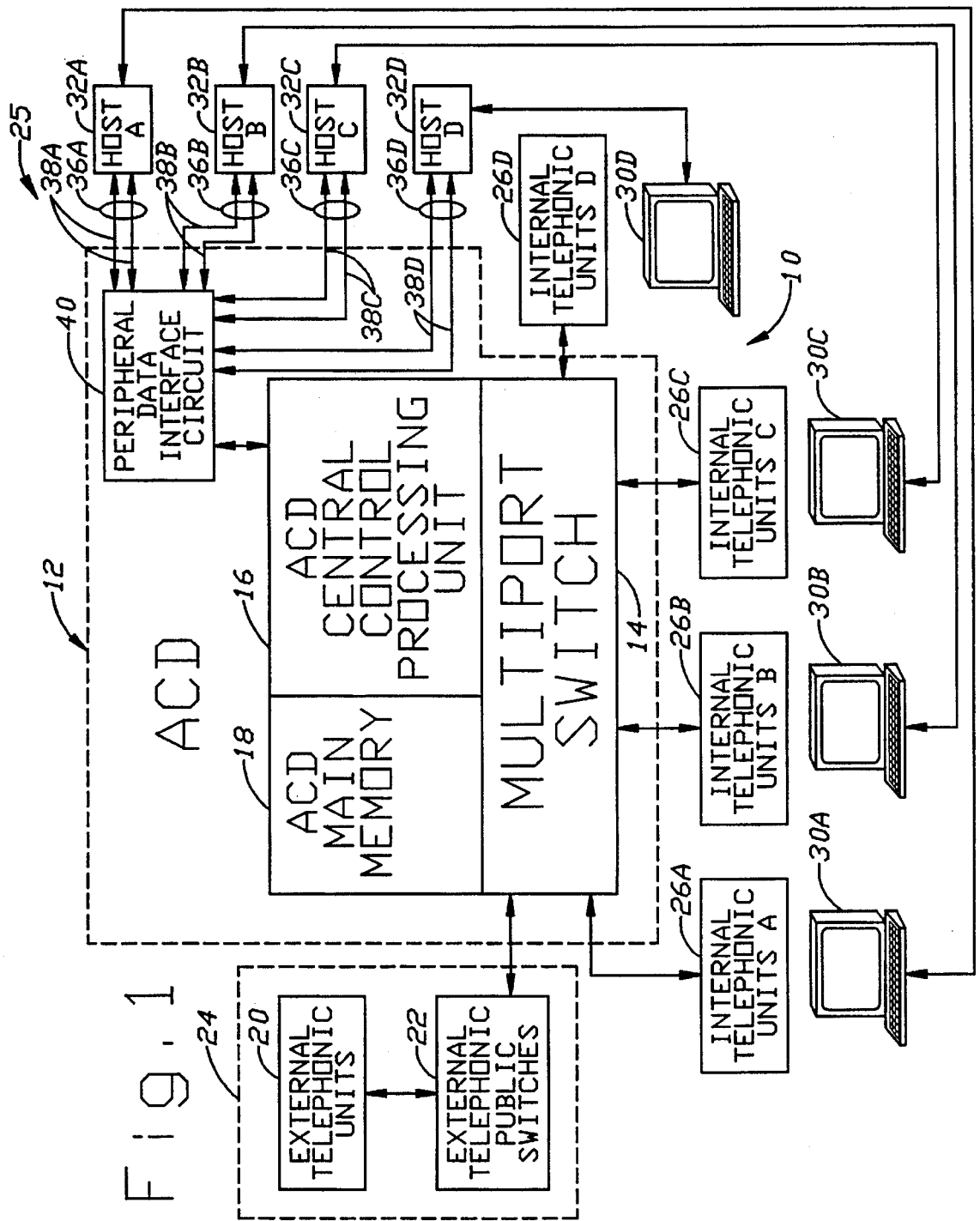
FIG. 1 is a functional block diagram of the preferred embodiment the telecommunication system of the present invention having an automatic call distributor coupled with multiple remote host computers.

Referring to FIG. 1, telecommunication system 10 is shown with an automatic call distributor (ACD) 12 having a multiport switch 14 operating under the control of a central control processing unit 16 in conjunction with main memory 18 for selectively interconnecting telephonic calls received from external telephonic units 20 through external public telephonic switches 22 of an external telephonic network 24 with a plurality of agent telephonic units 26A, 26B, 26C and 26D coupled with the multiport switch 14 of the call distributor 12. The agents stationed at the groups of internal telephonic units 26A–D service the telephonic calls received from the external telephonic units 20 through the multiport switch 14 of the ACD 10. At each agent station corresponding to the internal telephonic units 26A–D is an associated data terminal 30A, 30B, 30C and 30D. The data terminals 30A–D are coupled with an associated host data base computer 32A, 32B, 32C and 32D. The host data base computers 32A–D store customer information such as names, addresses, purchasing history, preferential treatment status, billing records and other types of data relating to callers from the external telephonic units. The plurality of host data base computers 32A–D are selectively provided by the user or purchaser of the telecommunication system in which is stored proprietary customer information.

The host data base computers 32A–D are preferably placed at a location, such as a user site, remote from the automatic call distributor 12 facility. The host data base computers 32A–D communicate with the central control processing unit 18 of the ACD 12 over associated transaction link interfaces 36A, 36B, 36C and 36D. Each transaction link interface 36A–D or logical link interface is coupled to a peripheral data interface (PDI) circuit 40 of the ACD 12. Messaging between the central control processing unit 16 and the plurality of host data base computers 32A–D is over the associated logical link interface 36A–D via the PDI circuit 40. The logical link interfaces 36A–D each have a pair of physical link lines 38A, 38B, 38C, 38D. Data communication over the physical links 38A–D between the host computers 32A–D and the ACD 12 follows an X.25 communication protocol. Messages are carried on both of the pair of physical links 38A–D during communication between the ACD central control processing unit 16 and the host computer 32A–D associated with the corresponding logical link interface 36A–D. If one of the pair of physical links 38A–D goes down or is disabled for a particular logical link interface 36A–D, then all messages transmitted between the associated host computer 32A–D and the ACD 12 are automatically carried on the other remaining physical link.

The peripheral data interface circuit card 40 provides the interface mechanism between the ACD central control processing unit 16 and the remote host data base computers 32A–D. The PDI circuit 40 has a Motorola 68000 microprocessor for providing the overall controlling functions of the PDI circuit. The PDI circuit 40 has a plurality of serial communication controllers (not shown) for providing serial communication over the physical links. The PDI circuit coordinates data transfers between the ACD central processing unit 16 and the peripheral remote host computers 32A–D. For further details of the operation of the peripheral data interface circuit 40, reference should be made to U.S. patent application Ser. No. 07/976,131 of Kovarik filed Nov. 12, 1992 entitled "Automatic Call Distributor With A Programmable Data Window Display System and Method".

The central control processing unit 16 is the primary controller for the automatic call distributor 12. The processing power for the central control processing unit 16 is preferably provided by a thirty-two bit Motorola 68030 microprocessor capable of either simplex or duplex operation. Generally, while the multilink host computer call control interface system 25 system of the present invention can be implemented in various types and sizes of an automatic call distributors, it is preferably employed in a call distributor of the type shown in U.S. Pat. No. 5,268,903 of Jones et al. entitled "Multichannel Telephonic Switching Network With Different Signaling Formats and Connect/PBX Treatment Selectable For Each Channel" issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No.

5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunications Switching System" issued Dec. 2, 1986.

The multiple host computers 32A–D are each connected to and selectively provide calling control functionality to the automatic call distributor 12 over the associated transaction link interface 36A–D. Customer information gathered by agents at the internal telephonic units 26A–D is entered at the associated data terminals 30A–D for storage at the corresponding host data base computers 32A–D. The host computers 32A–D are external remote mainframe computers which are selectively provided by the purchaser or user of the telecommunications system 10. Preferably, the host computers are any suitable minicomputer or microcomputer such as an International Business Machines (IBM) 3090, IBM AS400 or Hewlett Packard 9000 having an appropriate interface to an automatic call distributor.

The multiple transaction links 36A–D are run-time call control interfaces connecting a single individual ACD 12 with multiple host computers 32A, 32B, 32C and 32D. The transaction link interface 36A–D provides each associated host computer with call and position control for a corresponding group of interior telephonic units 26A–D. The particular host data base computer 32A–D associated with a defined group of internal telephonic units 26A–D is considered the controlling host computer for that particular group. The one of the plurality of host computers assigned to be the controlling host computer sends messages to ACD 12 requesting execution of various call control handling operations regarding telephonic calls associated with the internal telephonic units corresponding to the controlling host computer. Preferably, a selected controlling host computer is the host computer for a group of internal telephonic units which has a physical connection to the data terminals associated with the group of internal units. For example, in FIG. 1, host computer 32A is selectively determined to be the controlling host computer for internal telephonic units groups 26A since host 32A has a physical connection to data terminals 30A. Host computer 30A can appropriately display information concerning calls routed to agents at the internal telephonic units of group 26A at the corresponding data terminals 30A.

The internal telephonic units 26A–D associated with a particular controlling host computer are not limited to agent telephonic units, but rather, further include supervisory telephonic units, voice response units and other types of telephonic units coupled with the multiport switch 14. A controlling host is also selectively defined based on the type of call received at the switch 14, the inbound trunk lines which receive a call, call identification information such as DNIS and ANI numbers, and outbound call trunk lines. The transaction link interface 36A–D feature of the present invention sends each message pertaining to a particular call or group of internal units 26A–D to a single host data base computer with each host computer 32A–D connected to a pair of physical links 38A–D. Each of the host data base computers 32A–D controls and is informed about its own predetermined and defined set of internal telephonic units 26A–D (i.e. agent units, supervisor units, voice response units, etc.) and telephonic calls. A host computer, for example host computer 32A, identified as the one host computer which is enabled to initiate call handling requests for calls at a predefined group of internal unit 26A is considered the controlling host computer 32A for the corresponding internal units 26A. Requests for call handling operations by other noncontrolling host computers (i.e. hosts 32B, 32C and 32D) to be performed at internal units 26A which is controlled by host computer 32A are denied.

Messaging across transaction link 36A allows many calling actions that are often initiated at an internal telephonic unit 26A to be activated by the corresponding controlling host computer 32A. For example, an individual at an internal telephonic unit 26A selectively actuates an associated data terminal 30A to sign-in, sign-out, initiate a call, transfer a call, and clear a call by signalling the corresponding controlling host 32A. The host 32A communicates to the ACD 12 over the logical link interface 36A without agent intervention to automate routing of calls at the switch 14 and to provide customer data on an associated data terminal 30A to match an incoming call distributed at a particular internal unit 26A, called screen synchronization.

Each of the call servicing features is controlled by conversations which take place between the ACD 12 and the identified host computer 32A over the appropriate logical link interface 36A. These conversations consist of messages, built from message elements, which are preferably initiated by the designated host computer and sent to the ACD 12. The ACD 12 often responds with a message that the command completed successfully or failed due to a specific error. Communication over the physical links 38A–D to enable a call handling operation periodically requires one or more message-response conversations between a particular host computer 32A–D and the ACD 12.

The ACD 12 alternatively also provides unsolicited messages to the one designated controlling host computer, such as call arrival at the switch 14 and position status changes at the associated internal units, which then allows the controlling host to initiate a feature such as call routing, call transfer, internal telephonic unit status synchronization, or screen synchronization of information at an associated data terminal. When a call related feature operation such as screen synchronization is designated by the controlling host computer, the operation frequently requires the use of several alternative features to complete a series of conversations. If errors occur during operations, error messages are sent between the one identified controlling host computer 32A and ACD 12. Error messages are either a general error message (Negative Response) containing a specific error code, or a call servicing feature-specific error message.

The user is enabled to preselect separate segments of the system 10 to be dedicated for a particular host computer (i.e. trunk group lines x,y,z, DNIS Q,R,S and group A of internal telephonic units 26A are all assigned to host computer 32A. Calls coming in on trunk group lines x,y,z or having DNIS Q,R, or S are always routed to individuals stationed at internal telephonic units 26A). Once an initial call indication is sent to a particular host computer (e.g. call arrival message to the host computer) the call is flagged as being controlled by the host computer to which the original indication is provided.

The host computer to which the initial call indication is sent depends on the originator of the call indication and the predefined call handling routing priority pattern if one is present. If the originating indicator identifying a controlling host computer is a trunk line and the predefined routing priority pattern or telescript does either an INFORM HOST or REQUEST HOST command, the controlling host computer is based upon the last successfully translated routing operand (i.e. call identification information such as ANI and DNIS information or the particular trunk group of the trunk line receiving the call) in the predefined routing priority pattern prior to the INFORM or REQUEST HOST. If no successful translations were performed, then the default controlling host identifier is based upon the identification of the controlling host for the trunk line receiving the call. If the call arrival transmission fails (e.g. link is down), the call is still flagged as having the identified host computer as the controlling host computer for the call.

If the originator is an incoming trunk line and no call arrival is sent via the predefined routing priority pattern, the controlling host computer is based upon the controlling host identifier of the internal telephonic unit receiving the call. If the unit is an agent unit, supervisor unit, or voice response unit, it is the host computer identified in the units class of service memory table in the main memory 18. If the call is routed through an outbound trunk, the controlling host identifier for the trunk group of the particular outbound trunk is used. If the originator is an internal telephonic unit on the switch 14 and it is dialed directly by an individual at the unit, then the one controlling host computer is the host computer defined in the class of service table memory for the particular internal unit. If the originator is an internal telephonic unit on the switch 14 and it is dialing due to a request from one of the plurality of host computers 32A–D, the controlling host computer is the host which performed the request. Changes in status of the internal units 26A–D are reported to the controlling host computer defined for the particular internal unit in its class of service table in the main memory 18. Predictively out-dialed calls initiated by a host computer have the requesting host computer flagged as the controlling host computer for the out-dialed call.

Preferably a call related controlling host computer takes precedence over a position (i.e. internal unit) related controlling host. For example, if a call that is defined as controlled by a given host computer 32A is connected to an internal telephonic unit 26B which is set to be controlled by host computer 32B, only host computer 32A is enabled to perform call handling operations related to that call. Host computer 32B is still enabled to perform status change operations and to initiate calls for the associated internal telephonic unit 26B.

The messaging over the logical link interface 36A–D keeps all messages for a call directed at the identified controlling host computer, enables only the controlling host to send any call related requests, returns responses to the requesting host computer and sends all noncall-related messages to the assigned host computer for a particular internal telephonic unit.

Figure 2A:
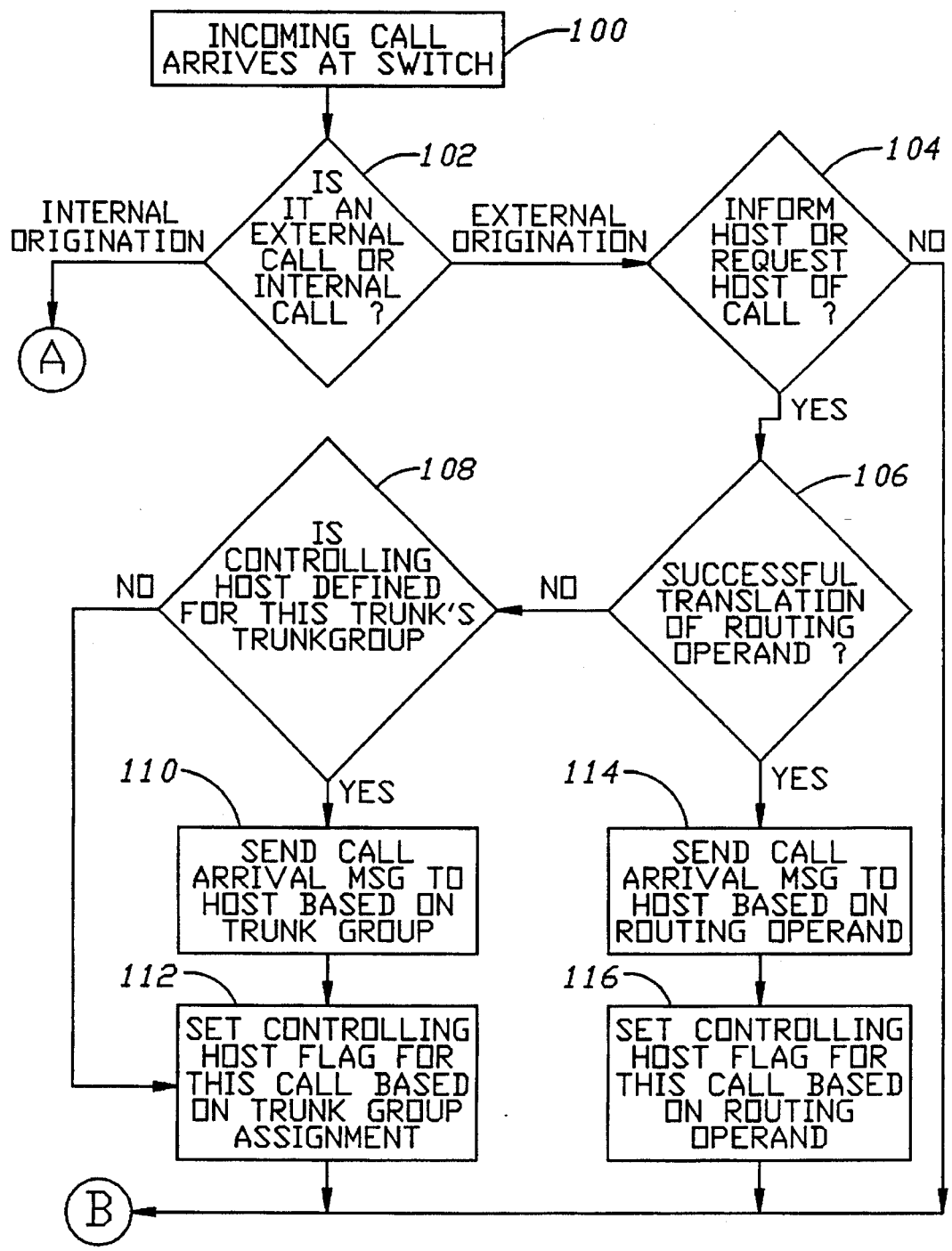
FIGS. 2A–2C form a composite flow chart of the multilink host computer call control interface procedure for processing an incoming telephonic call received at the multiport switch of the present invention.
Figure 2B:
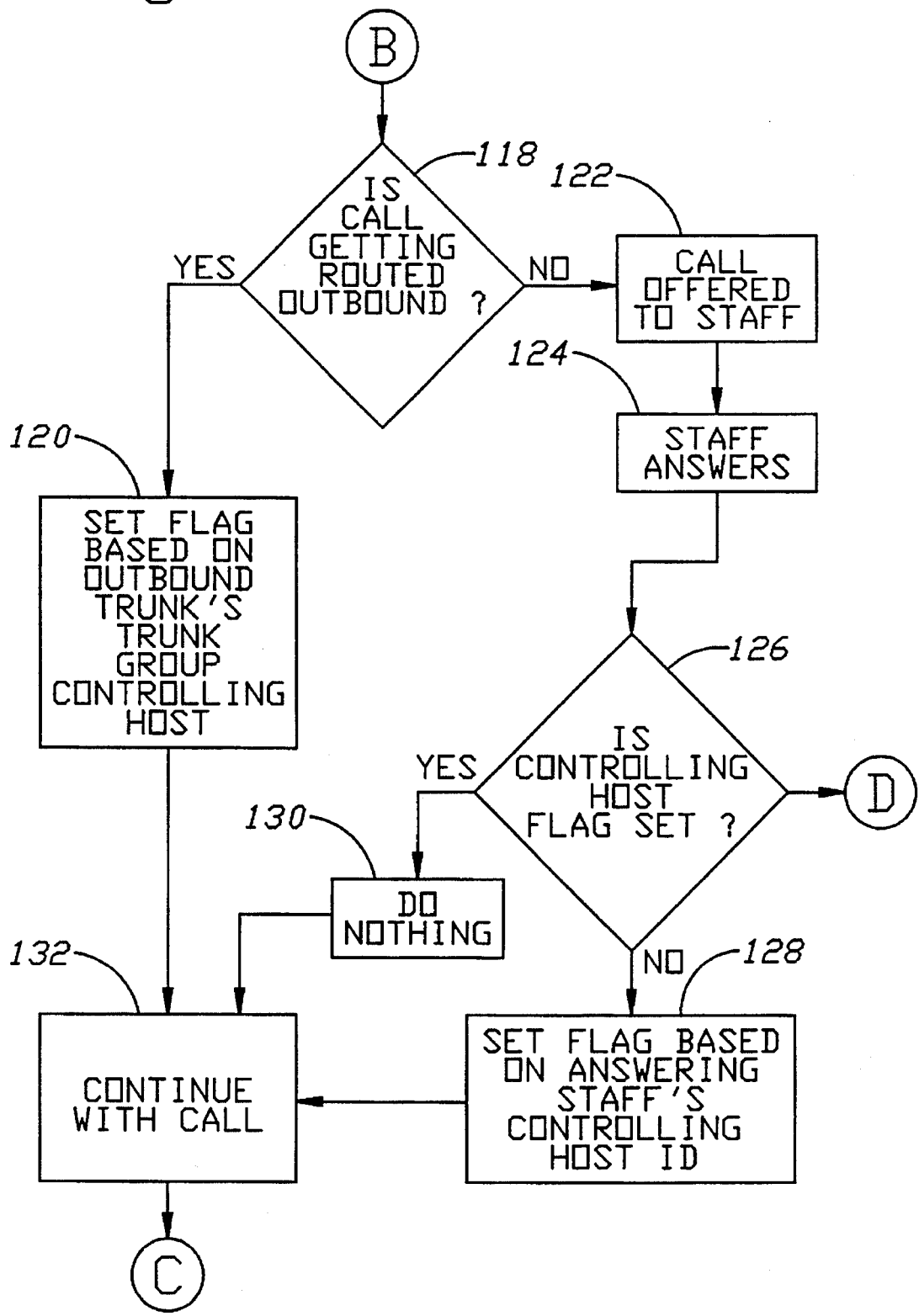
Figure 2C:
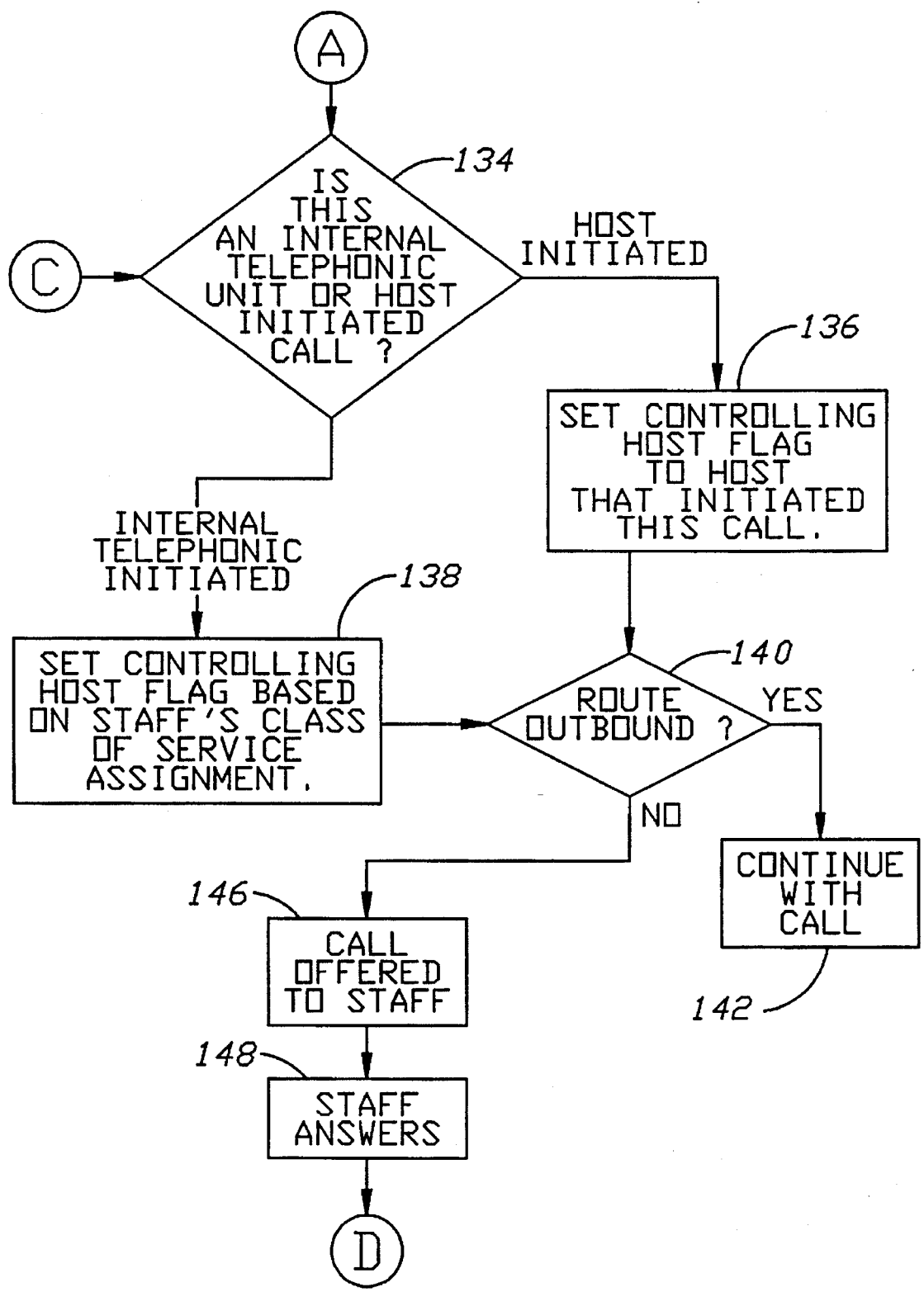

Referring now to FIGS. 2A–2C, the control for a received incoming call begins at step 100, FIG. 2A, with a telephonic call arriving on a port at the multiport switch 14. In step 102, the automatic call distributor (ACD) 12 determines if the received call is an external telephonic call from the external telephonic network 24 or an internal call received from an internal telephonic unit 26A–D or a host computer 32A–D coupled with the ACD 12. If the call originated from an internal telephonic unit 26A–D or host computer 32A–D at the telecommunication system, then step 134, FIG. 2C, is the next step in the process. If the received call originates outside the telecommunication system 10 (i.e. from the external network 24), then in step 104, the ACD 12 checks if the host computer will be informed of the call or if the ACD requests the host computer to provide routing instructions regarding the call.

If the ACD 12 will inform a host computer of the received call or will request a route from the host computer for the call, then in step 106, the ACD determines if a successful translation of the routing operand based on information received from the external network 24 (i.e. ANI or DNIS) or the trunk group assignment has occurred. If the routing operand translation is not successful, then in step 108 central processing unit 16 of the ACD 12 determines if a controlling host computer is defined for the particular trunk of a trunk group at which the call was received. If a controlling host computer is assigned to the trunk line on which the call was received, then in step 110 a call arrival message is sent to the corresponding controlling host computer based on the trunk group of the received call. In step 112 a controlling host flag is set in a call store table in the ACD main memory 18 for the received call based on the assignment of a controlling host computer indicated by the trunk group of the received call.

If the translation of the routing operand was successful in step 106, then in step 114 the ACD 12 sends a call arrival message to the one particular host computer identified in the defined routing operand. In step 116, the controlling host flag is set for the received call based on the predetermined routing operand. In step 118, FIG. 2B, the ACD 12 determines if the call is to be outbound routed through a dialing plan identifying an offnet number to the external telephonic network 24. If the call is an outbound routed call then in step 120, a flag is set based on the identified controlling host computer for the associated trunk group of the outbound trunk of the outbound routed call. In step 132, processing of the call is continued. If the call is not an outbound routed call, then in step 122, FIG. 2B, the call is offered to the appropriate agent or staff personnel at an internal telephonic unit 26A–D to service the call. In step 124, the appropriate staff individual answers the received call at an internal telephonic unit 26A–D. In step 126, the ACD central control processing unit 16 determines if the controlling host computer flag is set. If the controlling host computer flag is not set then in step 128, the flag is set based on the controlling host computer identification number associated with the staff individual who is assigned to answer the routed call at an internal telephonic unit 26A–D. If the controlling host flag is set then there is no need to identify a controlling host computer in step 130, and call processing of the call continues in step 132.

If in step 102, of FIG. 2A, the ACD 12 determines that the received call is an internally originated call, either from an internal telephonic unit or an out-dial request from a host computer, then in step 134, FIG. 2C, the ACD 12 determines if the internal call originated from an internal telephonic unit 26A–D or a host computer 32A–D. If the internal call was initiated by a host computer 32A–D, then in step 136 a controlling host flag is set for the particular host computer which initiated the internal call. If the internal call was initiated at an internal telephonic unit 26A–D, then in step 138, FIG. 2C, a controlling host flag is set for the call based on the predetermined class of service assignment for the individual staff personnel stationed at the internal telephonic unit which initiated the call. In step 140, the ACD 12 determines if the call is to be outbound routed to the external telephonic network 24. If the call is outbound routed then in step 142, FIG. 2C, call handling processing is maintained for the call. If the call is not outbound routed, then in step 146 the call is offered or routed to the appropriated staff individual at the corresponding internal telephonic unit. In step 148 the individual staff personnel answers the call and processing returns to step 126 of FIG. 2B, to determine if a controlling host computer flag is set for the received call.

Referring now to FIG. 3, the procedural processing flow for a call handling operation action requested by a host computer 32A–D begins at step 170 in which a host computer requests the ACD 12 to perform an action on a call. In step 172, the ACD central processing unit 16 determines if the requesting host computer is the controlling host computer for this call by comparing the host identification information in the request message with the host identification information associated with the call. If the requesting host computer is not the controlling host computer, then in step 174 the request for a particular action regarding the call is denied. If the requesting host computer is the controlling host computer, then in step 176 the particular requested action begins processing by the central control processing unit 16. In step 178, an acknowledgement message is sent by the ACD 12 over the appropriate logical link interface to the one controlling host computer for that call. In step 180, the ACD 12 determines if the request for action by the controlling host computer caused a change in the state of the individual staff person servicing the call at an internal telephonic unit. The call servicing states for an individual at an internal unit include available, unavailable, signed-in, signed-out, call work state, etc. No action is taken in step 182 if the state of the staff member servicing the call did not change as a result of the controlling host computer request. If the action request by the controlling host computer does change the state of the associated staff individual, then in step 184, FIG. 3, an internal telephonic unit position status change message is sent to the controlling host computer for the individual staff personnel member servicing the call at the corresponding internal unit.

Referring now to FIG. 4, the procedural processing flow for an out-dial request by a host computer begin at step 200 whereby a host computer sends a request to the ACD 12 for an out-dial call. In step 202, the ACD 12 determines if the requesting host computer is the controlling host computer associated with the individual staff personnel member of an internal unit servicing the call requested to be out-dialed by reading the class of service table memory for the individual staff member. If the requesting host computer is not the controlling host computer then the request for an out-dial call by the requesting host computer is denied in step 204. If the requesting host computer is the controlling host computer for the internal telephonic unit receiving a connected out-dial call, then in step 206 the request for the out-dial call is processed. In step 208 an acknowledgement of the out-dial request is sent to the controlling host computer corresponding to the individual staff member stationed at an internal telephonic unit which services the out-dialed call.

Figure 5:
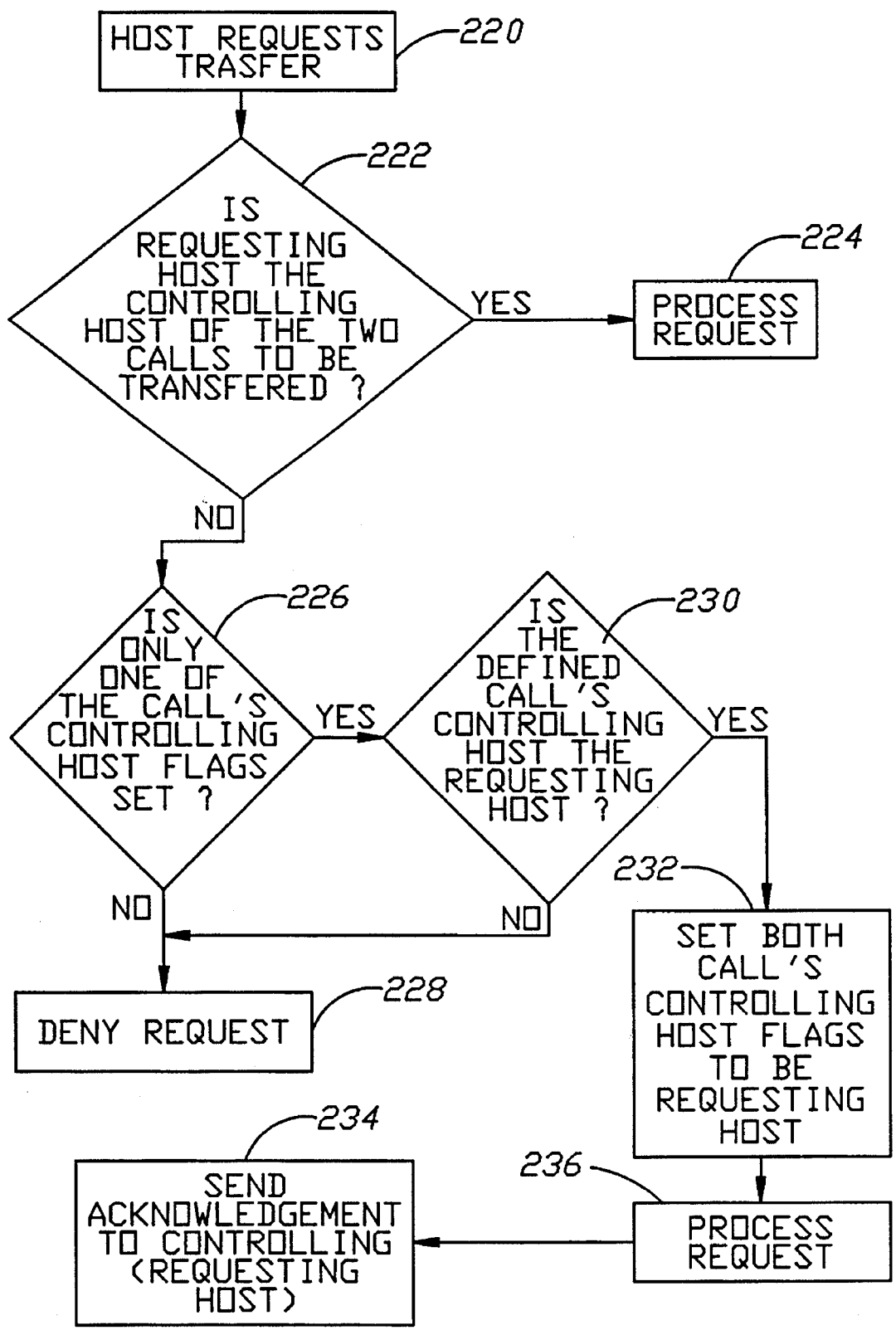
FIG. 5 is a flow chart of the preferred method of processing a call transfer from a host computer.

Referring now to FIG. 5, the process for a host computer initiated call transfer begins at step 220, in which a host computer requests a call transfer. In step 222, the ACD 12 determines if the requesting host computer is the controlling host computer of the two calls to be transferred together. If the requesting host computer is the controlling host computer of the two calls to be transferred, then in step 224 the request for call transfer is processed. If the requesting host is not the controlling host for both calls then in step 226, then the ACD 12 determines if a controlling host computer flag is set for only one of the calls. If the controlling host flag is set for both calls, then in step 228 the request for call transfer is denied since the requesting host computer is not the controlling host computer of both calls. If a controlling host computer flags is set for only one of the calls, then in step 230 the ACD central processing unit 16 determines if the controlling host computer for that call is the one host computer requesting the call transfer. If the controlling host computer for the call is not the requesting host computer, then in step 228 the request for call transfer is denied. If the controlling host computer for the call is the requesting host computer, then in step 232 the ACD 12 sets the controlling host flags for both calls to identify it as the requesting host computer. In step 234, the request for call transfer is processed. In step 236, the ACD 12 sends an acknowledgement message to the controlling host computer (i.e. requesting host computer) indicating that the request for call transfer has been accepted and is being processed.

While a detailed description of the preferred embodiment of the invention has been given, it should be appreciated that many variations can be made thereto without departing from the scope of the invention as set forth in the appended claims.

We claim:

1. In a telecommunication system having a single automatic call distributor with a multiport switch controlled by a central control processing unit and an associated memory for selectively interconnecting telephonic calls between external telephonic units of an external telephonic network and internal telephonic units coupled with the multiport switch, the improvement being a multilink host computer call control interface system, comprising:

a plurality of host computers coupled to the automatic call distributor; and means for enabling communication between the single automatic call distributor and the plurality of host computers to provide the plurality of host computers with control of call handling operations performed at the automatic call distributor in which said call handling operations include at least one of (a) sign-in of internal telephonic units, (b) sign-out of internal telephonic units, and (c) initiation of an out-dial call for connection at an internal telephonic unit.

2. The telecommunication system of claim 1 in which the communication enabling means includes a plurality of logical link interfaces corresponding to each of the plurality of host computers for connecting the automatic call distributor to the plurality of host computers.

3. The telecommunication system of claim 2 in which the plurality of logical link interfaces includes a pair of physical link lines for carrying messages between the automatic call distributor and the plurality of host computers.

4. The telecommunication system of claim 3 including means for automatically sending all messages between the automatic call distributor and one of the plurality of host computers corresponding to one of the logical link interfaces across one of the pair of physical links of the one logical link interface in response to the other of the pair of physical links becoming disabled.

5. The telecommunication system of claim 1 including means for associating one of the plurality of host computers to a preselected group of internal telephonic units, and means for identifying the one host computer as the controlling host computer for the preselected group of internal telephonic units.

6. The telecommunication system of claim 5 including means for transmitting from the automatic call distributor to the controlling host computer associated with the internal telephone units messages related to events occurring at the group of units, and means at the controlling host computer responsive to the messages transmitting means for initiating the automatic call distributor to perform operations at the internal telephonic units.

7. In a telecommunication system having a single automatic call distributor with a multiport switch controlled by a central control processing unit and an associated memory for selectively interconnecting telephonic calls between external telephonic units of an external telephonic network and internal telephonic units coupled with the multiport switch, the improvement being a multilink host computer call control interface system, comprising:

> a plurality of host computers coupled to the automatic call distributor:
>
> means for enabling communication between the single automatic call distributor and the plurality of host computers to provide the plurality of host computers with control of call handling operations performed at the automatic call distributor; and
>
> means for designating one of the plurality of host computers as a controlling host computer for controlling call handling operations including call and position control for a preselected associated group of internal telephonic units.

8. The telecommunication system of claim 7 including

> means for initiating a request for an action on a telephonic call at the automatic call distributor by one of the plurality of host computers,
>
> means for determining if the request is initiated from the controlling host computer, and
>
> means for denying the action request if the host computer initiating the request is not the controlling host computer.

9. The telecommunication system of claim 7 in which the designating means includes > means initiated at one of the plurality of host computers for requesting execution of an out-dial call at the automatic call distributor whereby the automatic call distributor automatically dials an external telephonic unit and connects the out-dial call received at the external telephonic unit with an internal telephonic unit, and
>
> means responsive to the out-dial call requesting means for appointing the one host computer requesting the out-dial call execution as the controlling host computer for the out-dial call.

10. In a telecommunication system having a single automatic call distributor with a multiport switch controlled by a central control processing unit and an associated memory for selectively interconnecting telephonic calls between external telephonic units of an external telephonic network and internal telephonic units coupled with the multiport switch, the improvement being a multilink host computer call control interface system, comprising:

> a plurality of host computers coupled to the automatic call distributor;
>
> means for enabling communication between the single automatic call distributor and the plurality of host computers to provide the plurality of host computers with control of call handling operations performed at the automatic call distributor; and
>
> means for assigning a telephonic call received at the multiport switch a controlling host computer from one of the plurality of host computers coupled with the call distributor to initiate the control of call handling operations associated with the received telephonic call.

11. The telecommunication system of claim 10 in which the assigning means includes means for identifying the one host computer as the controlling host computer based on at least one of > (a) identification of a trunk group at the multiport switch on which the telephonic call is received
>
> (b) call type identification information carried with the received telephonic call
>
> (c) a predefined routing priority pattern for the received call, and
>
> (d) a controlling host identifier associated with an internal telephonic unit connected with the received call.

12. The telecommunication system of claim 10 in which said call handling operations associated with the received call includes > routing the call to an internal telephonic unit specified by the controlling host computer.

13. The telecommunication system of claim 10 including means for designating another host computer other than the one host computer associated with the received call to a preselected internal telephonic unit to initiate control of call handling actions at the internal telephonic unit associated with the other host computer, and > means for routing the received call controlled by the one host computer to the internal telephonic unit controlled by the other host computer,
>
> means for assigning call control priority to the one host computer associated with the received call over the other host computer associated with the internal telephonic unit in response to the call routing means.

14. In a telecommunication system having a single automatic call distributor with a multiport switch controlled by a central control processing unit and an associated memory for selectively interconnecting telephonic calls between external telephonic units of an external telephonic network and internal telephonic units coupled with the multiport switch, the improvement being a method of initiating multiple host computer call control, comprising the steps of:

> coupling a plurality of host computers to the single automatic call distributor; and
>
> enabling communication between the single automatic call distributor and the plurality of host computers to provide the plurality of host computers with control of call handling operations including routing of a telephonic call received at the automatic call distributor to an internal telephonic unit.

15. The method of claim 14 including the step of designating one of the plurality of host computers as a controlling host computer for controlling call handling operations including call and position control for a preselected associated group of internal telephonic units.

16. The method of claim 15 including the steps of

> initiating a request for an action on the telephonic call at the automatic call distributor by one of the plurality of host computers,
>
> determining if the request for initiating an action on the telephonic call is from the controlling host computer, and
>
> denying the action request if the host computer initiating the request is not the controlling host computer.

17. The method of claim 14 including the step of assigning to the telephonic call received at the multiport switch a controlling host computer from one of the plurality of host computers coupled with the call distributor to initiate the control of call handling operations associated with the received telephonic call.

18. The method of claim 17 including the step of identifying the one host computer as the controlling host computer based on at least one of (a) identification of a trunk group at the multiport switch on which the telephonic call is received, (b) call type identification information carried with the received telephonic call, (c) a predefined routing priority pattern for the received call, and (d) a controlling host identifier associated with an internal telephonic unit connected with the received call.

* * * * *